(12) United States Patent
Ishikawa et al.

(10) Patent No.: US 8,313,027 B2
(45) Date of Patent: Nov. 20, 2012

(54) CARD READER AND CONTROL METHOD THEREFOR

(75) Inventors: Kazutoshi Ishikawa, Nagano (JP); Yasuhiro Kitazawa, Nagano (JP)

(73) Assignee: Nidec Sankyo Corporation (JP)

( * ) Notice: Subject to any disclaimer, the term of this patent is extended or adjusted under 35 U.S.C. 154(b) by 321 days.

(21) Appl. No.: 12/684,159

(22) Filed: Jan. 8, 2010

(65) Prior Publication Data

US 2010/0170949 A1 Jul. 8, 2010

(30) Foreign Application Priority Data

Jan. 8, 2009 (JP) ................................. 2009-002182

(51) Int. Cl.
G06K 7/00 (2006.01)
(52) U.S. Cl. ........................................ 235/439; 235/475
(58) Field of Classification Search .................. 235/439, 235/442, 446, 448, 475, 482, 483, 484, 485, 235/486
See application file for complete search history.

(56) References Cited

U.S. PATENT DOCUMENTS

2004/0018765 A1 * 1/2004 Chaillie ....................... 439/325

FOREIGN PATENT DOCUMENTS

JP 2005-165625 A 6/2005

* cited by examiner

*Primary Examiner* — Karl D Frech
(74) *Attorney, Agent, or Firm* — Cantor Colburn LLP

(57) ABSTRACT

A card reader may include a card insertion port, a card feeding passage along which a card is carried, a card surface abutting member such as a shutter member capable of abutting with a surface of the card, an abutting member sensor for detecting a position of the shutter member, a card insertion detection mechanism, and a control section for discriminating whether the card is a special shaped card or not on a basis of detection results of the abutting member sensor and the card insertion detection mechanism. A control method may include a shutter opening step, a feeding and stop step in which the card is carried by a first feeding distance in a taking-in direction and stopped, a shutter closing step in which the shutter member is moved in a direction for closing the card feeding passage, and a discrimination step in which the card is discriminated whether the card is a special shaped card or not on the basis of a detection result by the open-and-close sensor after the shutter closing step.

23 Claims, 10 Drawing Sheets

CARD READER AND CONTROL METHOD THEREFOR

CROSS REFERENCE TO RELATED APPLICATION

The present invention claims priority under 35 U.S.C. §119 to Japanese Application No. 2009-2182 filed Jan. 8, 2009, the entire contents of which are incorporated herein by reference.

FIELD OF THE INVENTION

An embodiment of the present invention may relate to a card reader and a control method for the card reader.

BACKGROUND OF THE INVENTION

The present applicant has proposed a card reader which is capable of discriminating whether a card taken into the card reader is a card having a normal shape which is in compliance with ISO (JIS) standards or a nonstandard card having a special shape (see, for example, Japanese Patent Laid-Open No. 2005-165625).

In the card reader described in the above-mentioned Patent Reference, a card having a special shape and a card having a normal shape are discriminated by using a pre-head and a card detect switch which are disposed in the vicinity of a card insertion port. Specifically, in this card reader, a card having a normal shape which is formed with a magnetic stripe 2a on its surface is discriminated from a card which is formed with a magnetic stripe 2a on its surface and which is having a special shape, like a card 2A shown in FIG. 10(A), where one of rear side corners in a card taking-in direction is formed in a curved shape having a large radius of curvature.

In recent years, nonstandard cards having various special shapes have been circulating on the market. For example, the following cards have begun to circulate on the market, i.e., a card 2B (see FIG. 10(B)) having a similar outward shape to the card 2A and provided with an IC chip 2b but without a magnetic stripe 2a, a card 2C (see FIG. 10(C)) which is provided with an IC chip 2b but without a magnetic stripe 2a and which is formed in a semicircular shape at one end in a longitudinal direction of the card, in other words, both rear side corners are formed in a curved shape having a large radius of curvature, and a card 2D (see FIG. 10(D)) which is provided with an IC chip 2b but without a magnetic stripe 2a and which is formed in a curved shape at both ends in a longitudinal direction of the card. Therefore, a card reader is desired on the market which is capable of discriminating various cards having such special shapes and, when the card is judged to have a predetermined special shape, the card is taken into the inside to perform a predetermined processing.

However, the card reader described in the above-mentioned Patent Reference cannot discriminate the cards 2B through 2D having no magnetic stripe 2a to be a card having a predetermined special shape. Further, even when the magnetic stripe 2a is formed on a card, the card reader described in the above-mentioned Patent Reference cannot discriminate whether the card is a card having a predetermined special shape or not unless the magnetic stripe 2a is formed over a length in compliance with the standards. In other words, it is difficult that the card reader described in the above-mentioned Patent Reference discriminates various cards having special shapes.

SUMMARY OF THE INVENTION

In view of the problem described above, at least an embodiment of the present invention may advantageously provide a card reader which is capable of discriminating various cards having special shapes and a control method for the card reader.

According to at least an embodiment of the present invention, there may be provided a card reader including a card insertion port into which a card is inserted, a card feeding passage along which the card inserted from the card insertion port is carried, a card surface abutting member which is capable of protruding to and retreating from the card feeding passage and which is capable of abutting with a surface of the card, an abutting member sensor for detecting a protruding and retreating state of the card surface abutting member to and from the card feeding passage, a card insertion detection mechanism for detecting whether the card is inserted from the card insertion port or not, and a control section for discriminating whether the card is a special shaped card or not on the basis of a detection result of the abutting member sensor and a detection result of the card insertion detection mechanism.

In the card reader in accordance with an embodiment of the present invention, a control section for discriminating whether the card is a special shaped card or not on the basis of a detection result of the abutting member sensor for detecting a protruding and retreating state of the card surface abutting member to and from the card feeding passage and a detection result of the card insertion detection mechanism. Therefore, in the embodiment of the present invention, even when a magnetic stripe is not formed on the surface of a card, an inserted card is discriminated whether it is a special shaped card or not. Further, in the embodiment of the present invention, even when a magnetic stripe formed on the surface of a card is provided with a nonstandard length, an inserted card is discriminated whether it is a special shaped card or not. In other words, in the embodiment of the present invention, various cards having special shapes can be discriminated.

In accordance with an embodiment of the present invention, the card insertion detection mechanism is a contact type detection mechanism including a card end contact member which is capable of protruding to and retreating from the card feeding passage and which is capable of abutting with an end part of the card in a widthwise direction of the card that is substantially perpendicular to a thickness direction of the card and a taking-in direction of the card. According to this structure, even when an inserted card is a transparent card, the card is discriminated whether it is a special shaped card or not.

In accordance with an embodiment of the present invention, the card surface abutting member is a shutter member for opening or closing the card feeding passage, and the abutting member sensor is an open-and-close sensor for detecting an open-and-close state of the shutter member. According to this structure, the card is discriminated whether it is a special shaped card or not by utilizing the shutter member and the open-and-close sensor. Therefore, another card surface abutting member and another abutting member sensor are not required to discriminate whether the card is a special shaped card or not. Accordingly, the structure of the card reader can be simplified.

In accordance with an embodiment of the present invention, the card reader includes a card feeding mechanism for carrying the card along the card feeding passage, and a shutter drive mechanism for driving the shutter member. In addition, the control section controls the card feeding mechanism, after a card detected state by the card insertion detection mechanism has changed to a non-detected state, so that the card is carried by a first feeding distance in the taking-in direction of the card and stopped, and then the control section controls the shutter drive mechanism so that the shutter member is moved in a direction for closing the card feeding passage, and then the control section discriminates whether the card is a special shaped card or not on the basis of a detection result of the open-and-close sensor.

Specifically, the special shaped card may be a card whose at least one corner on a rear end side in the taking-in direction is formed in a curved shape having a larger radius of curvature in comparison with a normal shaped card. Further, it is preferable that the card feeding mechanism includes at least two feeding rollers, and a detection sensor for detecting a card is disposed nearer to a card insertion port side in the taking-in direction than a feeding roller disposed on an inner side of the two feeding rollers. In this case, it may be structured that the control section detects presence and absence of the card by the detection sensor when the card has been carried by the first feeding distance and stopped and, when the presence of the card is detected, the control section judges that the card is a normal shaped card and, when the card is not detected (absence), the control section moves the shutter member in a direction for closing the card feeding passage, and the control section discriminates whether the card is a special shaped card or not on the basis of the detection result by the open-and-close sensor. Further, in a case that the card has been carried by the first feeding distance and stopped and, in this state, when the presence of the card is not detected by the detection sensor and, in addition, when the card is not detected by the open-and-close sensor, it may be structured that the control section carries the card by not less than the first feeding distance in an eject direction of the card and then the control section carries the card by a second feeding distance shorter than the first feeding distance in the taking-in direction and stopped and, in this state, the shutter member is moved in the direction for closing the card feeding passage, and the control section discriminates whether the card is a special shaped card or not on the basis of the detection result of the open-and-close sensor.

In accordance with an embodiment of the present invention, the first feeding distance is set depending on a special shape of the card on which recording processing and/or reproducing processing of information is performed in the card reader. According to this structure, the first feeding distance is set so as to correspond to a special shaped card which has been circulated in the market where the card reader is installed. Therefore, the card inserted into the card reader is adequately discriminated whether it is a special shaped card or not. In other words, it is adequately discriminated whether recording processing and/or reproducing processing of information to and from the inserted card are permitted in the card reader or not.

In accordance with an embodiment of the present invention, the card reader includes a pre-head which is disposed in the vicinity of the card insertion port for reproducing information recorded in a magnetic stripe formed on a surface of the card, and/or a metal sensor which is disposed in the vicinity of the card insertion port for detecting an IC chip in the card. According to this structure, an inserted card is discriminated whether it is a magnetic card or not, and/or whether it is a contact type IC card or not. Therefore, the control section is capable of adequately judging what kind of processing is required to the card after it has been taken into the card reader.

In accordance with an embodiment of the present invention, the control section restricts a processing function for a card in the card reader when judged that the card is a special shaped card. According to this structure, even when a card taken into the card reader is a special shaped card, an appropriate processing corresponding to the card can be performed.

In accordance with an embodiment of the present invention, the control section is connected to a host control section for controlling a host device on which the card reader is mounted, and the control section selects whether discrimination for a special shaped card is performed or not depending on a control command from the host control section. Further, in accordance with an embodiment of the present invention, the control section is connected to a host control section for controlling a host device on which the card reader is mounted, and a control program which relates to a control for discriminating whether the card is a special shaped card or not is capable of being downloaded from the host control section. According to this structure, control for the card reader corresponding to the market where the card reader is installed can be performed.

Further, according to at least an embodiment of the present invention, there may be provided a control method for a card reader having a card feeding passage along which a card inserted from a card insertion port is carried, a shutter member for opening and closing the card feeding passage, an open-and-close sensor for detecting an open-and-close state of the shutter member, and a card insertion detection mechanism for detecting whether the card is inserted from the card insertion port or not. The control method includes a shutter opening step in which the shutter member is retreated from the card feeding passage when the card inserted from the card insertion port is detected by the card insertion detection mechanism, a feeding and stop step which is performed after the shutter opening step and after a card detected state by the card insertion detection mechanism has changed to a non-detected state and in which the card is carried by a first feeding distance in a taking-in direction of the card and stopped, a shutter closing step in which the shutter member is moved in a direction for closing the card feeding passage, and a discrimination step in which the card is discriminated whether the card is a special shaped card or not on the basis of a detection result by the open-and-close sensor after the shutter closing step.

In a control method for a card reader in accordance with the embodiment of the present invention, in the feeding and stop step, after a detected state by the card insertion detection mechanism of the card which is inserted from the card insertion port has changed to a non-detected state, the card is carried by a first feeding distance in a taking-in direction of the card and stopped and, in the shutter closing step, the shutter member is moved in a direction for closing the card feeding passage and, in the discrimination step, the card is discriminated whether the card is a special shaped card or not on the basis of a detection result by the open-and-close sensor after the shutter closing step. Therefore, an inserted card is discriminated whether it is a card having a special shape or not on the basis of the detection result of the card insertion detection mechanism and the detection result of the open-and-close sensor. Accordingly, in accordance with the embodiment of the present invention, even when a magnetic stripe is not formed on the surface of a card, the inserted card is discriminated whether it is a special shaped card or not. Further, in the embodiment of the present invention, even when a magnetic stripe formed on the surface of a card is provided with a nonstandard length, an inserted card is discriminated whether it is a special shaped card or not. In other words, in the embodiment of the present invention, various cards having special shapes can be discriminated.

Specifically, the special shaped card is a card whose at least one corner on a rear end side in the taking-in direction is formed in a curved shape having a larger radius of curvature in comparison with a normal shaped card. Further, the card reader includes a card feeding mechanism provided with at least two feeding rollers, and a detection sensor for detecting presence and absence of a card which is disposed nearer to a card insertion port side in the taking-in direction than a feeding roller disposed on an inner side of the two feeding rollers and, when the presence of the card is detected by the detection sensor in the feeding and stop step, the card is judged as a normal shaped card and, when the card is not detected, the shutter closing step and the discrimination step are performed to discriminate whether the card is a special shaped card or not.

Further, in accordance with an embodiment of the present invention, the control method for a card reader further includes a shutter re-opening step in which the shutter member is retreated from the card feeding passage when the open-and-close sensor has detected that the shutter member has closed the card feeding passage in the discrimination step, a reverse feeding and stop step which is performed after the shutter re-opening step so that the card is carried in an eject direction of the card by not less than the first feeding distance and stopped, a re-feeding and stop step which is performed after the reverse feeding and stop step so that the card is carried in the taking-in direction of the card by a second feeding distance shorter than the first feeding distance and stopped, a shutter re-closing step which is performed after the re-feeding and stop step so that the shutter member is moved in a direction for closing the card feeding passage, and a re-discrimination step in which the card is discriminated whether the card is a special shaped card or not on the basis of the detection result by the open-and-close sensor after the shutter re-closing step. According to this structure, an inserted card is discriminated in a step-by-step manner whether it is a special shaped card or not. Therefore, various cards having special shapes can be discriminated.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 4(A) is a view showing a state where a shutter member has closed a card feeding passage and FIG. 4(B) is a view showing a state where the shutter member has opened the card feeding passage.

DETAILED DESCRIPTION OF THE PREFERRED EMBODIMENTS

An embodiment of the present invention will be described below with reference to the accompanying drawings.

Figure 1:
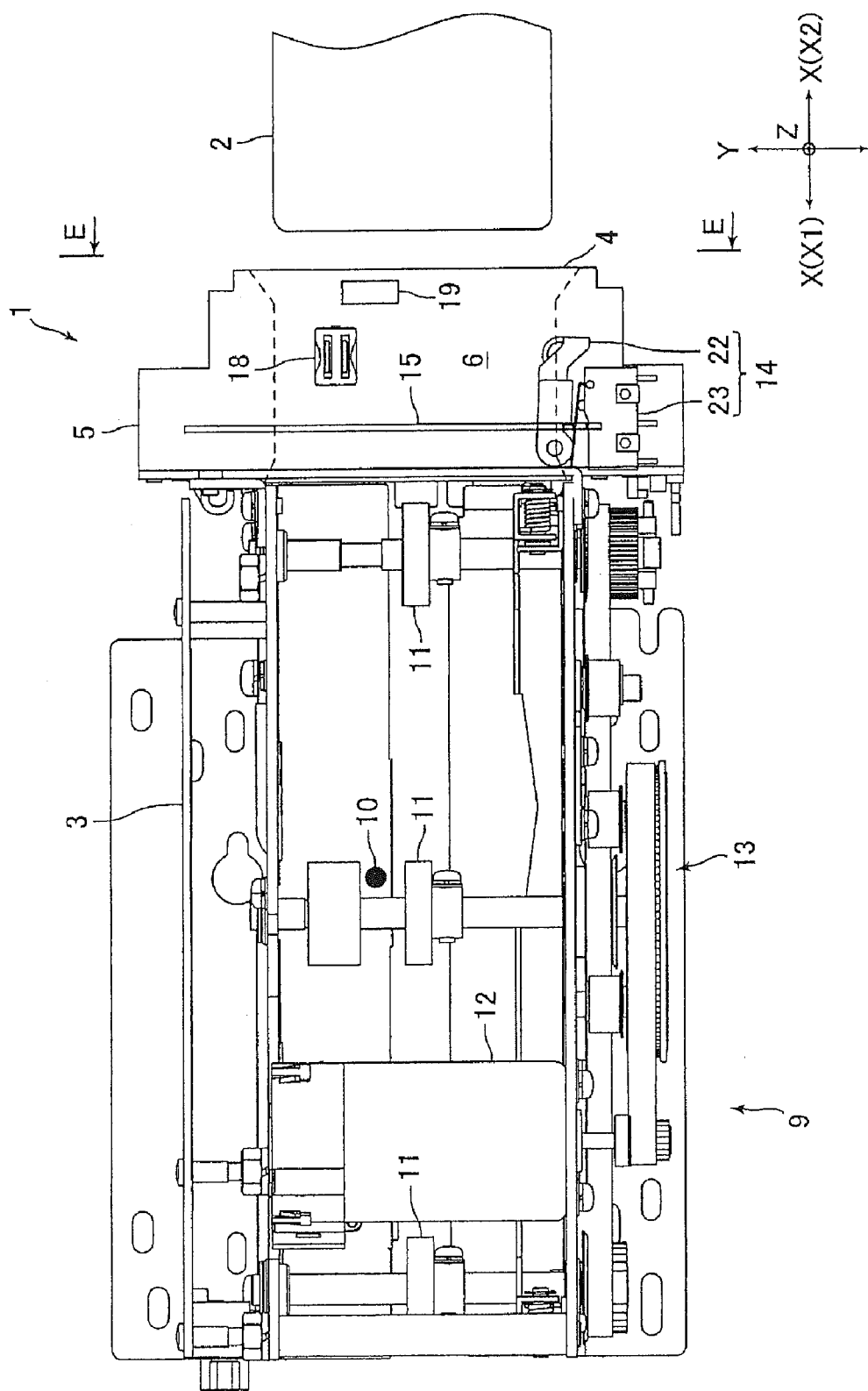
FIG. 1 is a top plan view showing a structure of a main part of a card reader in accordance with an embodiment of the present invention.
Figure 2:
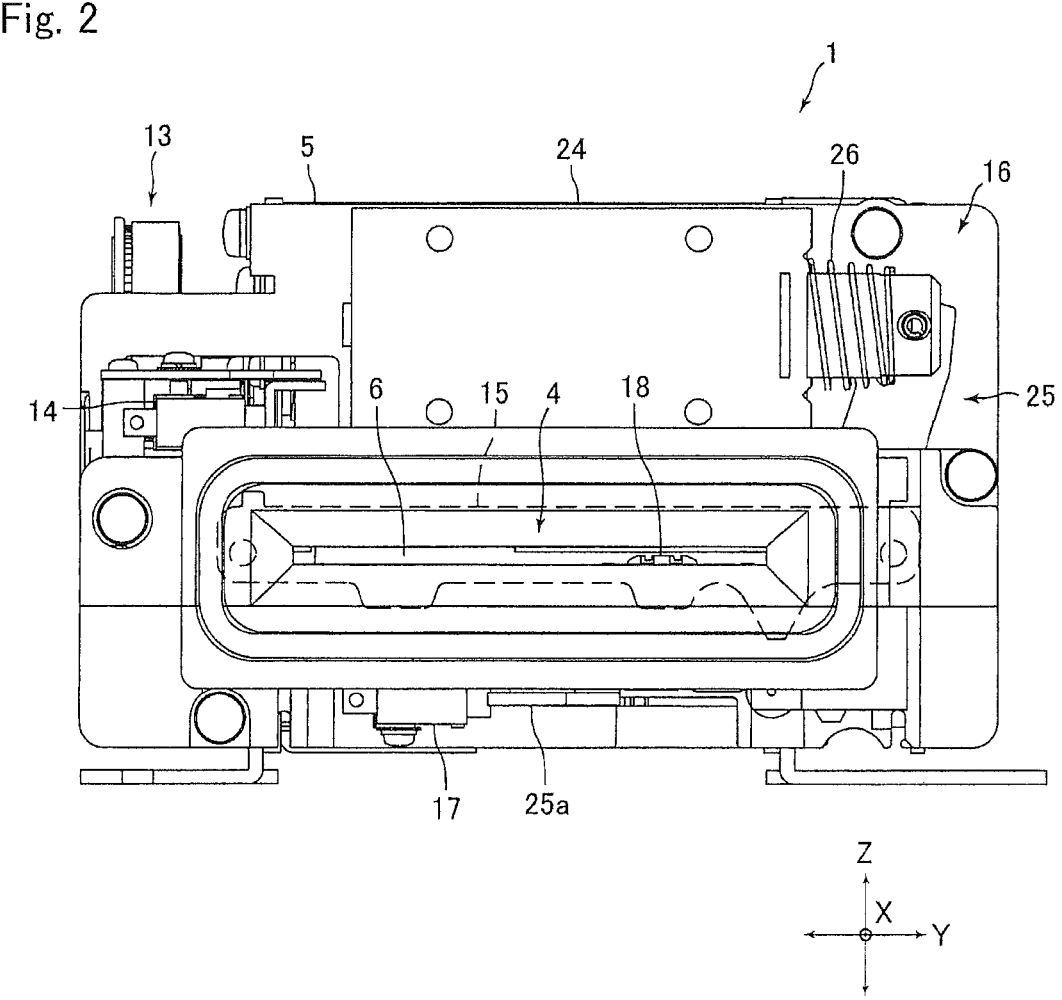
FIG. 2 is a view showing the card reader in the "E-E" direction in FIG. 1.

FIG. 1 is a top plan view showing a structure of a main part of a card reader 1 in accordance with an embodiment of the present invention. FIG. 2 is a view showing the card reader 1 in the "E-E" direction in FIG. 1.

A card reader 1 in this embodiment is a card reader which is also capable of processing various cards 2A through 2D formed in special shapes shown in FIGS. 10(A) through 10(D). The card reader 1 includes, as shown in FIGS. 1 and 2, a card processing part 3 for reproducing information recorded in a card 2 and/or for recording information in the card 2 and a card insertion part 5 which is formed with a card insertion port 4 for inserting or ejecting the card 2. The inside of the card reader 1 is formed with a card feeding passage 6 where a card 2 inserted from the card insertion port 4 is carried.

In this embodiment, a card 2 is carried in an "X" direction (lateral direction) in FIG. 1. In other words, the "X" direction is a feeding direction of a card 2. Further, in this embodiment, a card 2 is taken in an "X1" direction in FIG. 1 and the card 2 is ejected in an "X2" direction. In other words, the "X1" direction is a taking-in direction of a card 2 and the "X2" direction is an eject direction of the card 2. Further, a "Z" direction (direction perpendicular to the paper surface) in FIG. 1 is a thickness direction of a card 2 and a "Y" direction perpendicular to the "X" direction and the "Z" direction in FIG. 1 (upper and lower direction) is a widthwise direction of a card 2 (short widthwise direction).

A card 2 is, for example, a rectangular card made of vinyl chloride whose thickness is about 0.7-0.8 mm. Depending on its application, the card 2 is, for example, formed with a magnetic stripe 2a on its surface or buried with an IC chip 2b. Further, the card 2 may be built in with an antenna for communication. In accordance with an embodiment of the present invention, the card 2 may be a PET (polyethylene terephthalate) card whose thickness is about 0.18-0.36 mm, a paper card having a predetermined thickness or the like.

The card processing part 3 includes a card feeding mechanism 9 for feeding a card 2 along a card feeding passage 6 and a reproducing and recording means of information such as a magnetic head (not shown) or an IC contact points (not shown). Further, the card processing part 3 also includes a photo sensor 10 for detecting presence of a card 2 in the card feeding passage 6.

The card feeding mechanism 9 includes three feeding rollers 11, a drive motor 12 for rotationally driving the feeding rollers 11, and a power transmission mechanism 13 for transmitting power of the drive motor 12 to the feeding rollers 11. Further, the card feeding mechanism 9 includes pad rollers (not shown) which are oppositely disposed and urged toward the feeding rollers 11.

Three feeding rollers 11 are disposed with predetermined distances between them in the feeding direction of a card 2. Specifically, three feeding rollers 11 are disposed so that the distances between the feeding rollers 11 are set to be smaller than a length (length in a longitudinal direction ("X" direction)) of a card 2 having a normal shape in compliance with the standards of ISO (JIS).

The photo sensor 10 is an optical type sensor comprised of a light emitting element and a light receiving element. The photo sensor 10 is, as shown in FIG. 1, disposed in the vicinity of a center feeding roller 11 which is disposed at a center part of the card processing part 3 in the feeding direction of a card 2. Specifically, the photo sensor 10 is disposed nearer to a card insertion port 4 side than the center feeding roller 11 in the feeding direction of a card 2. In accordance with an embodiment of the present invention, a mechanical type sensor such as a contact switch may be disposed instead of the photo sensor 10.

Figure 3:
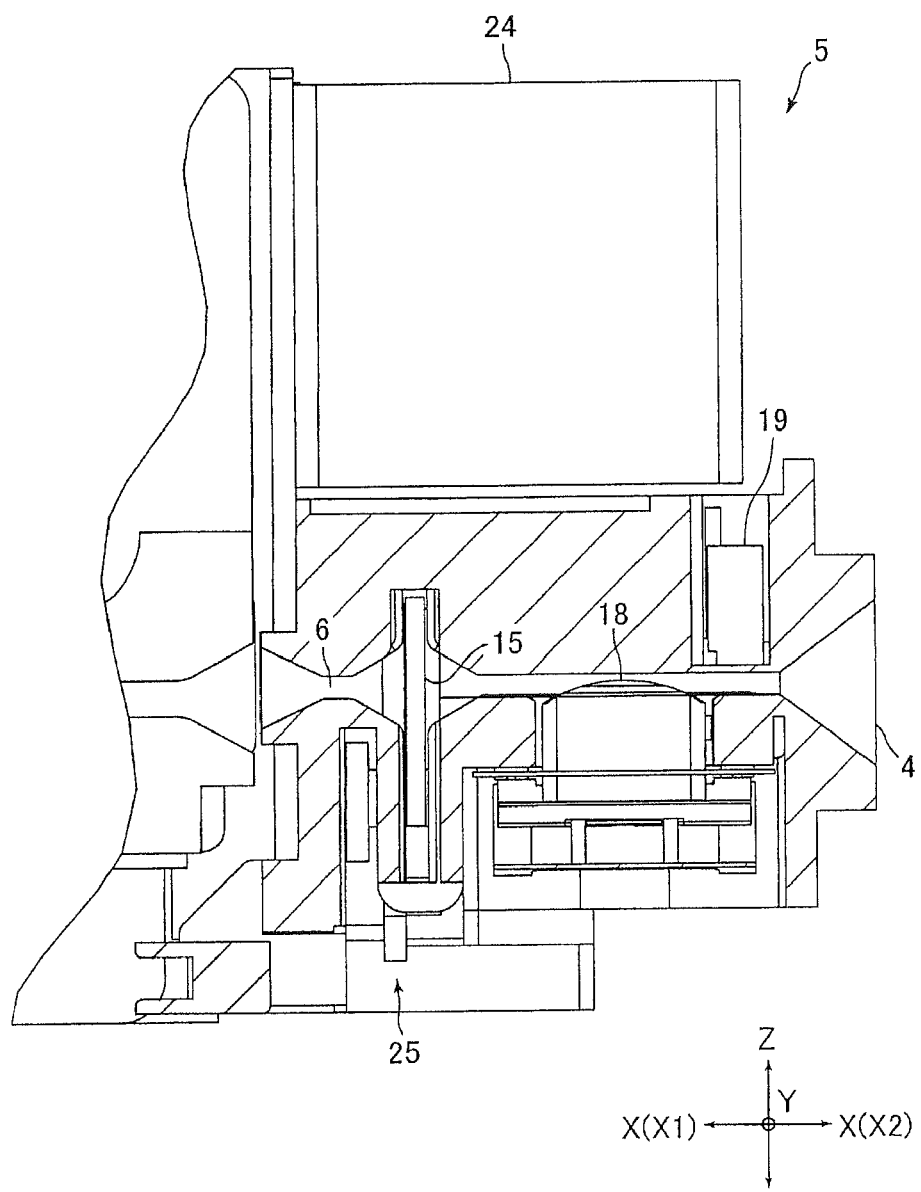
FIG. 3 is an explanatory cross-sectional view showing a structure of a card insertion part in FIG. 1.
Figure 4A:
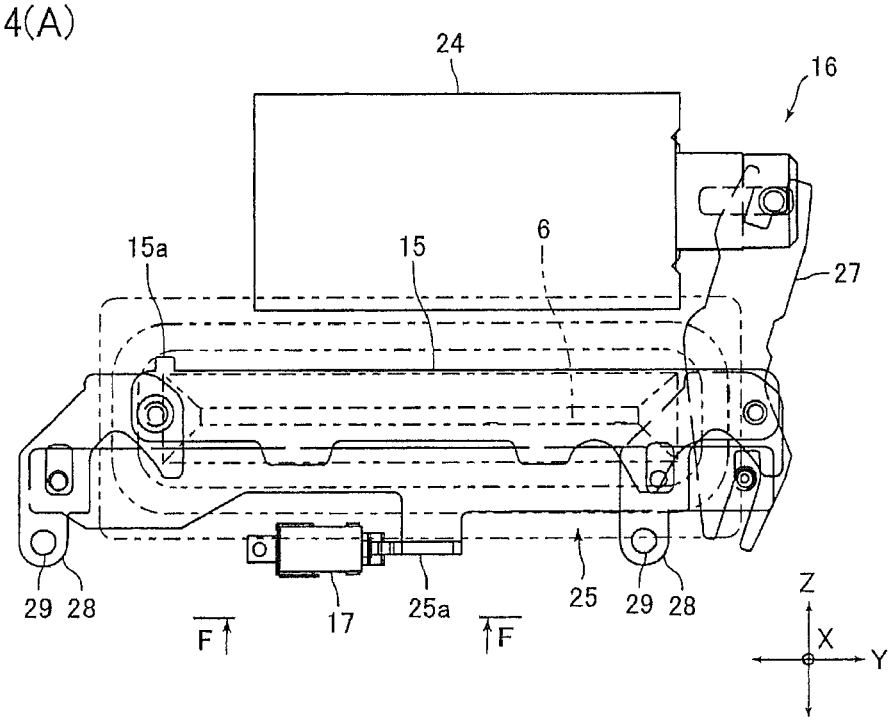
FIGS. 4(A) and 4(B) are explanatory views showing a structure of a shutter drive mechanism shown in FIG. 2.
Figure 4B:
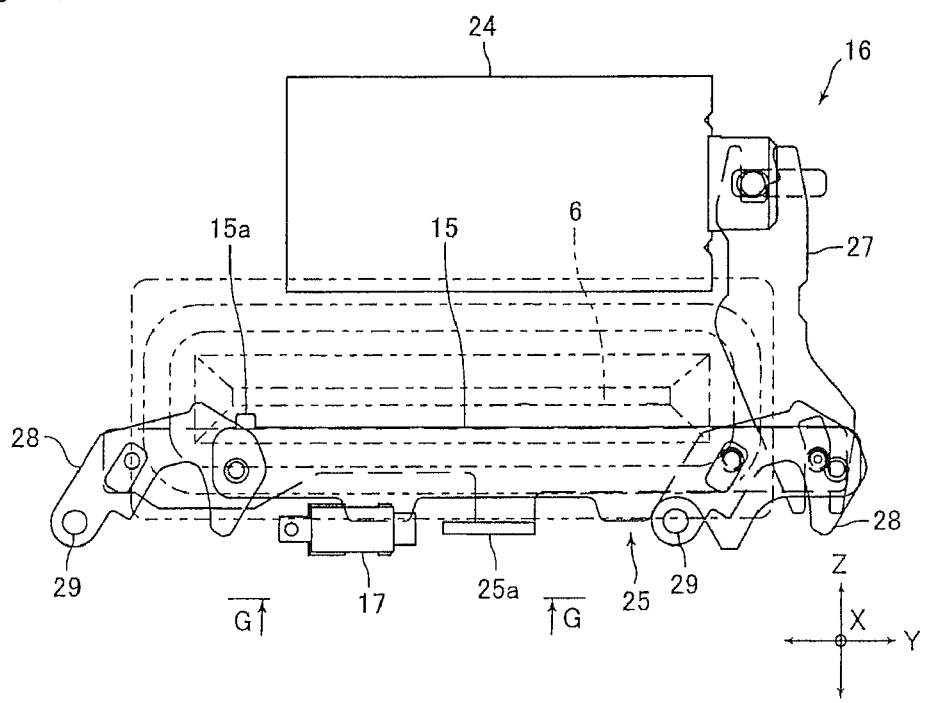
Figure 5A:
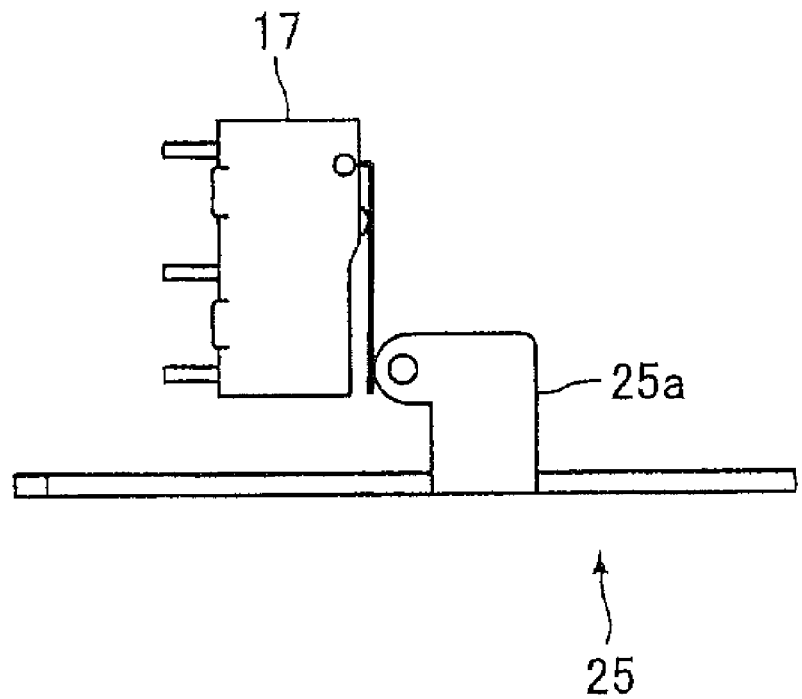
FIG. 5(A) is a view showing a relationship between an open-and-close sensor and a lever part which is viewed in the "F-F" direction in FIG. 4(A)
Figure 5B:
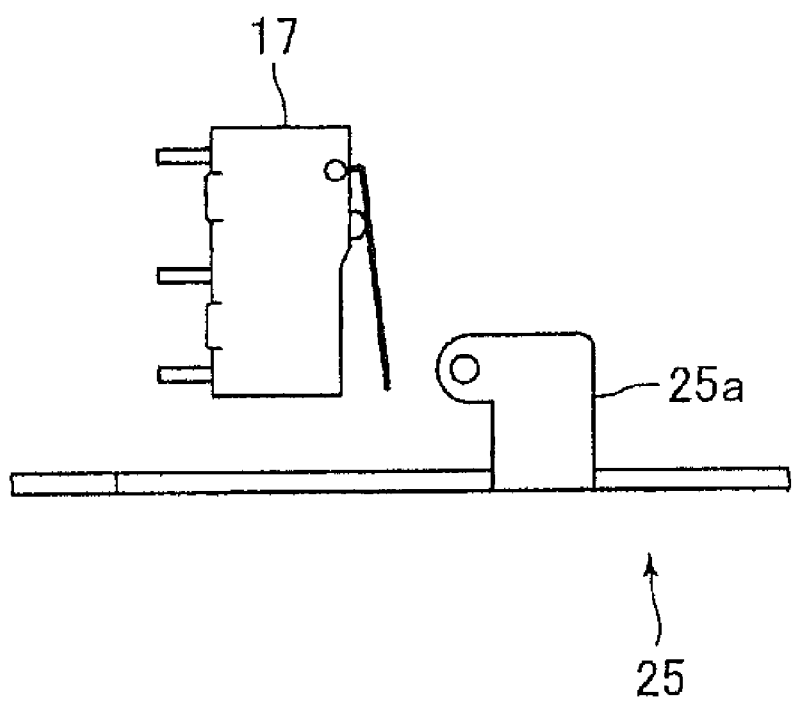
FIG. 5(B) is a view showing the relationship between the open-and-close sensor and the lever part which is viewed in the "G-G" direction in FIG. 4(B).

FIG. 3 is an explanatory cross-sectional view showing a structure of the card insertion part 5 in FIG. 1. FIGS. 4(A) and 4(B) are explanatory views showing a structure of a shutter drive mechanism 16 shown in FIG. 2. FIG. 4(A) is a view showing a state where a shutter member 15 has closed the card feeding passage 6 and FIG. 4(B) is a view showing a state where the shutter member 15 has opened the card feeding passage 6. FIG. 5(A) is a view showing a relationship between an open-and-close sensor 17 and a lever part 25a which is viewed in the "F-F" direction in FIG. 4(A) and FIG. 5(B) is a view showing the relationship between the open-and-close sensor 17 and the lever part 25a which is viewed in the "G-G" direction in FIG. 4(B).

The card insertion part 5 includes a card insertion detection mechanism 14 for detecting whether a card 2 is inserted from a card insertion port 4 or not, a shutter member 15 for opening or closing the card feeding passage 6, a shutter drive mechanism 16 for driving the shutter member 15, and the open-and-close sensor 17 for detecting an open-and-close state of the shutter member 15. Further, the card insertion part 5 includes a pre-head 18 for reproducing magnetic information recorded on an magnetic stripe 2a and a metal sensor 19 for detecting an IC chip 2b.

The card insertion detection mechanism 14 includes a sensor lever 22 as a card end contact member, which is capable of abutting with one end part in a widthwise direction of a card 2, and a card width sensor 23 for detecting whether the sensor lever 22 is abutted with a card 2. In other words, the card insertion detection mechanism 14 in this embodiment is a contact type detection mechanism having the sensor lever 22 which is abutted with a card 2.

The sensor lever 22 is turnably held with a shaft as a turning center and is capable of protruding to and retreated from the card feeding passage 6. The card width sensor 23 is a contact switch which is provided with a lever member and a contact point pressed by the lever member. For example, the card width sensor 23 is a micro-switch. In this embodiment, when an end part in the widthwise direction of a card 2, which is inserted from the card insertion port 4, is abutted with the sensor lever 22, the sensor lever 22 is turned to abut with the lever member of the card width sensor 23 and, as a result, the contact point is pressed by the lever member. In other words, the card width sensor 23 in this embodiment detects that a card 2 inserted from the card insertion port 4 is abutted with the sensor lever 22 and, as a result, it is detected that a card 2 has been inserted from the card insertion port 4.

In accordance with an embodiment of the present invention, the card width sensor 23 may be an optical type sensor comprised of a light emitting element and a light receiving element. Further, the card insertion detection mechanism 14 may be a mechanical type detection mechanism having a contact point which is capable of directly abutting with an end part in the widthwise direction of a card 2.

The shutter member 15 is formed in a flat plate shape. An upper end of the shutter member 15 in FIGS. 4(A) and 4(B) is formed with a protruded part 15a which is protruded toward an upper side. The shutter drive mechanism 16 includes a solenoid 24 as a drive source and a link mechanism 25 which connects the solenoid 24 with the shutter member 15. The link mechanism 25 includes an actuating member 27 connected with the solenoid 24, two turning members 28 connected with the shutter member 15 and the like. In this embodiment, in a state that the solenoid 24 is not energized ("OFF" state), as shown in FIG. 4(A), the card feeding passage 6 is closed by the shutter member 15 through an urging force of a compression coil spring 26 (see FIG. 2) which is attached to a plunger of the solenoid 24. On the other hand, when the solenoid 24 is set in an energized state ("ON" state), as shown in FIG. 4(B), the actuating member 27 is moved to turn the turning members 28 with supporting shafts 29 as a turning center. When the turning members 28 are turned around the supporting shafts 29, the shutter member 15 is retreated from the card feeding passage 6 to open the card feeding passage 6. In other words, the shutter member 15 is moved in a thickness direction of a card 2 to open and close the card feeding passage 6.

The open-and-close sensor 17 is a contact switch which is provided with a lever member and a contact point pressed by the lever member. For example, the open-and-close sensor 17 is a micro-switch. In this embodiment, when the shutter member 15 has closed the card feeding passage 6, as shown in FIG. 5(A), a lever part 25a formed in the link mechanism 25 is abutted with a lever member of the open-and-close sensor (micro-switch) 17 and its contact point is pressed by the lever member. Further, when the shutter member 15 has opened the card feeding passage 6, as shown in FIG. 5(B), the lever part 25a is separated from the lever member of the open-and-close sensor 17. In accordance with an embodiment of the present invention, the open-and-close sensor 17 may be an optical type sensor having a light emitting element and a light receiving element.

As described above, the shutter member 15 closes the card feeding passage 6 and retreats from the card feeding passage 6. In other words, the shutter member 15 is capable of protruding to and retreated from the card feeding passage 6. Further, the shutter member 15 is moved in the thickness direction of a card 2 to open and close the card feeding passage 6. In other words, the shutter member 15 is abutted with a surface of a card 2. As described above, the shutter member 15 in this embodiment is a card surface abutting member which is capable of protruding to and retreated from the card feeding passage 6 and which is abutting with the surface of a card 2. Further, the open-and-close sensor 17 in this embodiment is an abutting member sensor for detecting a protruded state and a retreated state of the shutter member 15, which is the card surface abutting member, to and from the card feeding passage 6.

A pre-head 18 is disposed in the vicinity of the card insertion port 4 in the feeding direction of a card 2. Similarly, a metal sensor 19 is also disposed in the vicinity of the card insertion port 4 in the feeding direction of a card 2. The metal sensor 19 is a magnetic type sensor having an excitation coil and a detection coil.

Figure 6:
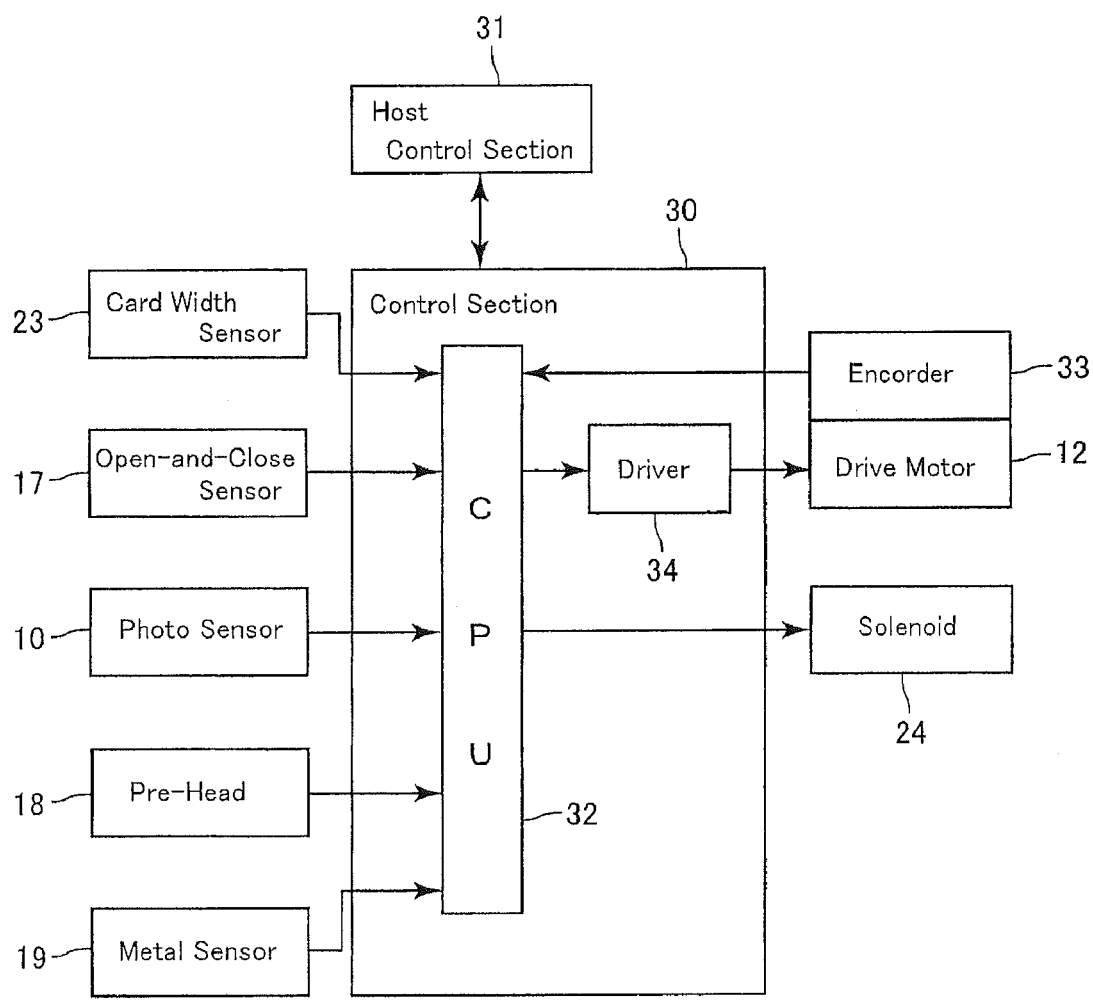
FIG. 6 is a block diagram showing a schematic structure of a control section and related portions in the card reader shown in FIG. 1.
Figure 7:
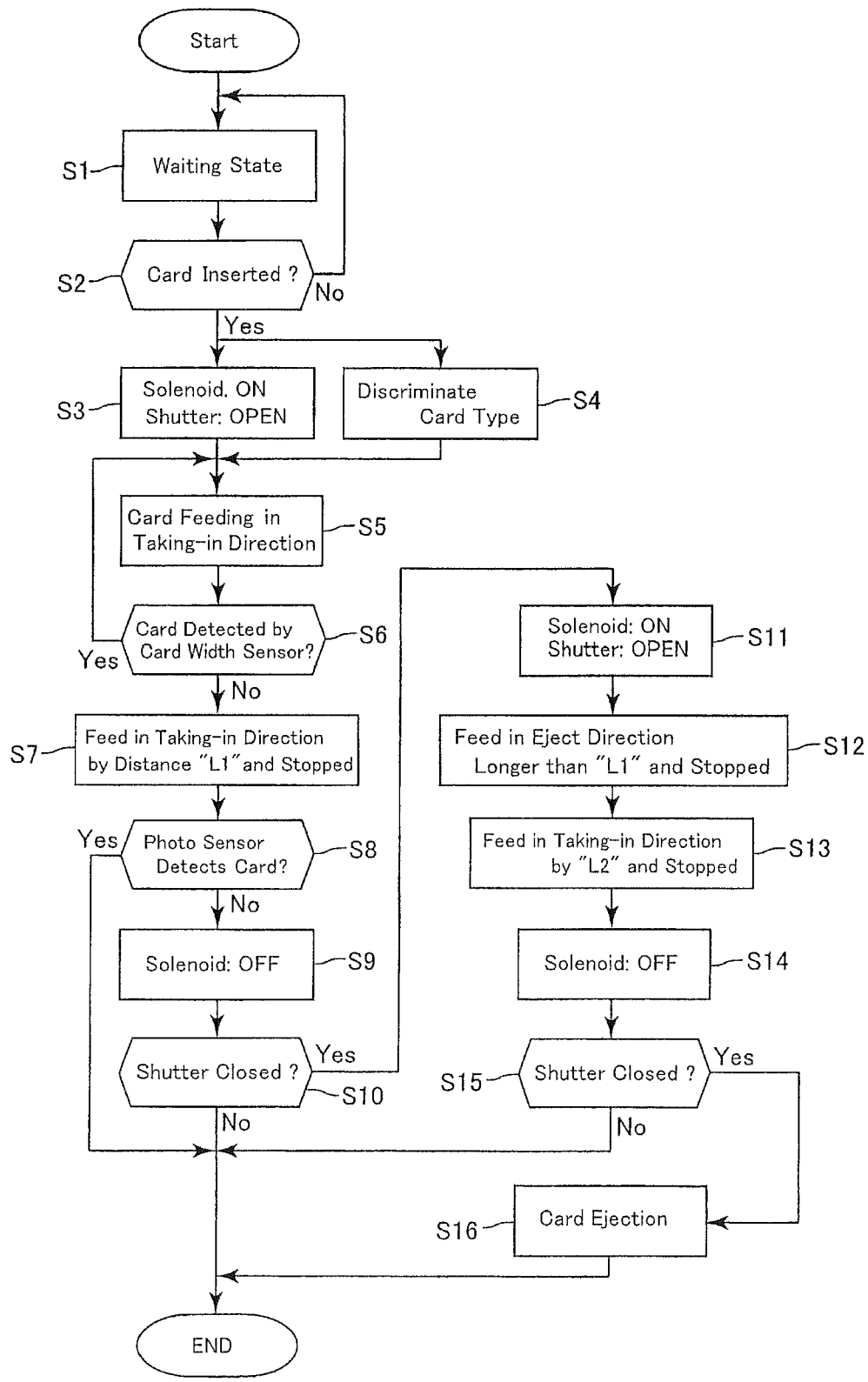
FIG. 7 is a flow chart showing an example of a taking-in control flow of a card where a card is taken into an inside of the card reader shown in FIG. 1.

FIG. 6 is a block diagram showing a schematic structure of a control section 30 and related portions in the card reader 1 shown in FIG. 1. FIG. 7 is a flow chart showing an example of a taking-in control flow of a card 2 where the card 2 is taken into an inside of the card reader 1 shown in FIG. 1. FIGS. 8(A), 8(B) and 8(C) and FIGS. 9(A), 9(B) and 9(C) are explanatory views showing taking-in controls of a card 2 shown in FIG. 7. Only structures related to a taking-in control of a card 2 are shown in FIG. 6. In this embodiment, the taking-in control of a card is a control for discriminating whether a recording processing and/or a reproducing processing of information of an inserted card 2 is capable of being performed in the card reader 1 or not.

A control section 30 for performing various controls for the card reader 1 is connected with a host control section 31 for controlling a host device for an ATM or the like on which the card reader 1 is mounted. The control section 30 is provided with a CPU 32. The CPU 32 is connected with the photo sensor 10, the open-and-close sensor (micro-switch) 17, the pre-head 18, the metal sensor 19 and the card width sensor 23, and their output signals are inputted into the CPU 32. Further, the CPU 32 is connected with an encoder 33 of the drive motor 12 and an output signal from the encoder 33 is inputted into the CPU 32. In addition, the CPU 32 is connected with the drive motor 12 through a driver 34 and connected with the solenoid 24.

The card reader 1 in this embodiment takes a card 2 into its inside, for example, as follows. In other words, as shown by the flow in FIG. 7, first, in a waiting state (step S1) for waiting insertion of a card 2, the control section 30 judges whether a card 2 is inserted from the card insertion port 4 or not (step S2). Specifically, based on an output signal from the card width sensor 23, the CPU 32 judges whether a card 2 has been inserted from the card insertion port 4 or not. Alternatively, based on an output signal from the pre-head 18, the CPU 32 judges whether a card 2 has been inserted from the card insertion port 4 or not.

In the step S2, when judged that a card 2 has been inserted from the card insertion port 4, the control section 30 sets the solenoid 24 in an "ON" state to make the shutter member 15 retreat from the card feeding passage 6 to open the card feeding passage 6 (step S3). Further, the control section 30 discriminates whether the inserted card 2 is a magnetic card having a magnetic stripe 2a or not, and discriminates whether the inserted card 2 is an IC card having an IC chip 2b or not (step S4). Specifically, based on output signals from the pre-head 18 and the metal sensor 19, the CPU 32 discriminates whether the card 2 is a magnetic card and/or an IC card or not.

After that, the control section 30 carries a card 2 in the "X1" direction (taking-in direction) (step S5). Specifically, the CPU 32 outputs a drive signal for the drive motor 12 to the driver 34 to drive the card feeding mechanism 9 and the card 2 is carried in the taking-in direction. Further, the control section 30 judges whether the card 2 has been detected by the card width sensor 23 (step S6). In other words, the CPU 32 judges whether the end part in the widthwise direction of the card 2 has been abutted with the sensor lever 22 on the basis of an output signal from the card width sensor 23.

Feeding of the card 2 is continued while the card 2 has been detected by the card width sensor 23. On the other hand, in the step S6, when judged that the card 2 is no longer detected by the card width sensor 23, immediately after that, the control section 30 controls the card feeding mechanism 9 so that the card 2 is carried in the taking-in direction by a predetermined feeding distance "L1" and then stopped (step S7). Specifically, based on an output signal from the encoder 33, the CPU 32 controls the drive motor 12 through the driver 34.

Figure 8A:
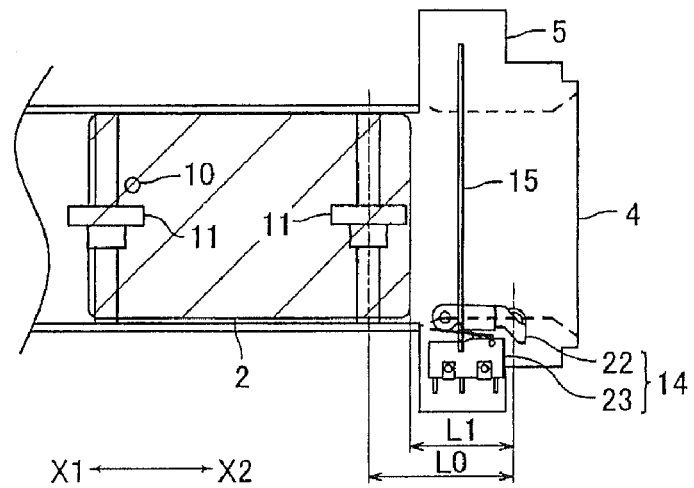
FIGS. 8(A), 8(B) and 8(C) are explanatory views showing the taking-in control of a card shown in FIG. 7.
Figure 8B:
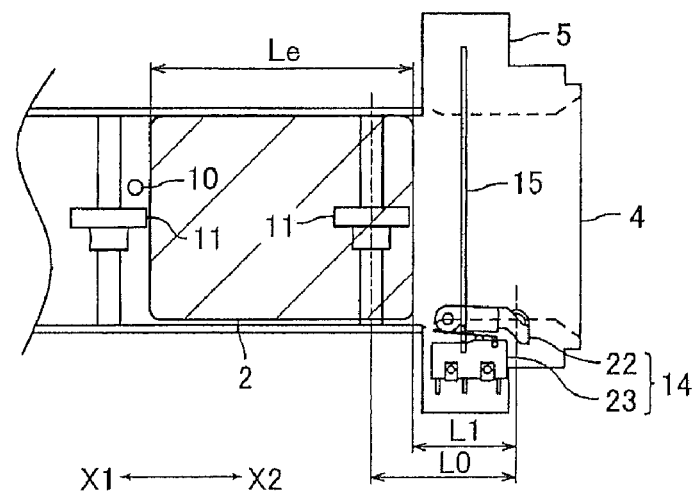

The feeding distance "L1" is set according to the shape of a card 2 which is permitted to be processed in the card reader 1. Further, the feeding distance "L1" can be set arbitrarily. However, the feeding distance "L1" is, as shown in FIGS. 8(A) and 8(B), set to be smaller than a distance "L0" which is from a contacted position of the sensor lever 22 with an end part of a card 2 to a first feeding roller 11 disposed on a card insertion port 4 side. This is because that a card 2 shorter than a distance between two feeding rollers 11 is prevented from being taken into the inside of the card reader 1. Further, the feeding distance "L1" is set so that, when a card 2 is a normal shaped card in compliance with the standards, the card 2 is detected by the photo sensor 10 after the card 2 has been fed by the feeding distance "L1".

After that, the control section 30 judges whether the card 2 is detected by the photo sensor 10 (step S8). In the step S8, when judged that the card 2 is detected by the photo sensor 10, the card 2 is a normal shaped card in compliance with the standards as shown in FIG. 8(A). In other words, when judged that the card 2 is detected by the photo sensor 10 in the step S8, a normal processing for the card 2 is carried out in the card reader 1.

Therefore, in the step S8, when judged that the card 2 is detected by the photo sensor 10, the control section 30 judges that the card 2 is a normal shaped card and the taking-in control for the card 2 to the inside of the card reader 1 is finished. After that, the control section 30 carries out predetermined processing for the card 2 within the card reader 1. For example, in the step S4, when judged that the card 2 is a magnetic card, reproduction and recording of magnetic data are performed. In the card reader 1 in this embodiment, also in a case of the card 2D shown in FIG. 10(D), the card 2D is detected by the photo sensor 10 in the step S8 and thus, similar to a normal shaped card, the taking-in control for the card 2D to the inside of the card reader 1 is finished. After that, the control section 30 performs predetermined processing for the card 2D within the card reader 1.

Figure 8C:
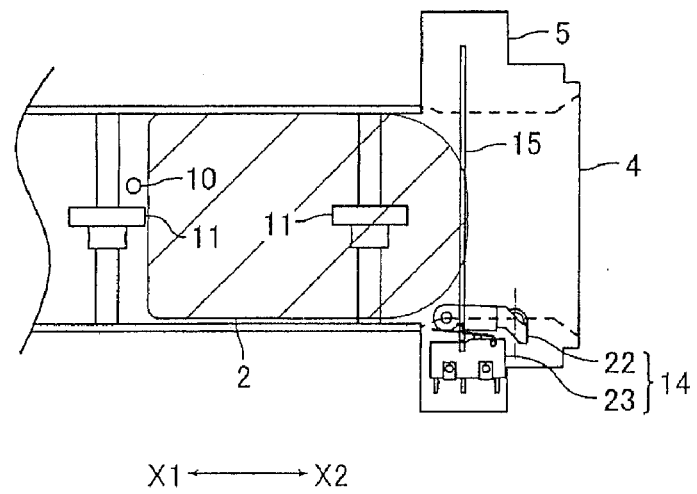
Figure 9A:
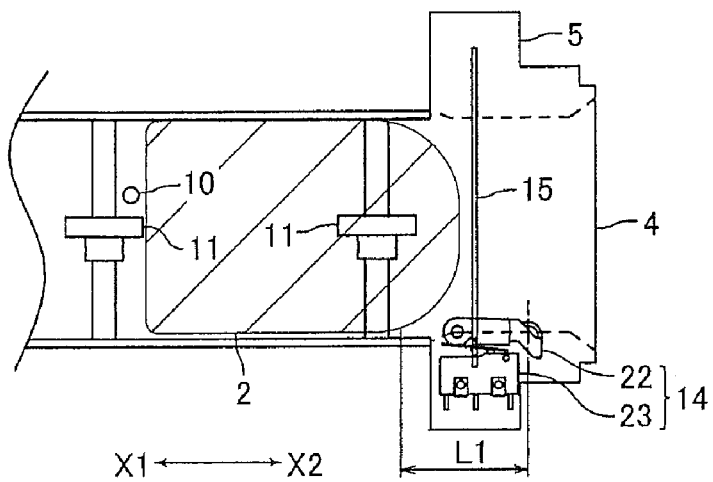
FIGS. 9(A), 9(B) and 9(C) are explanatory views showing the taking-in control of a card shown in FIG. 7.

On the other hand, in the step S8, when judged that the card 2 is not detected by the photo sensor 10, the card 2 may be a short card whose length "Le" is shorter than the distance between two feeding rollers 11 as shown in FIG. 8(B), or a special shaped card having a nonstandard special shape as shown in FIG. 8(C) or FIG. 9(A). The card reader 1 in this embodiment is also capable of processing the special shaped card. Therefore, in the step S8, when judged that the card 2 is not detected by the photo sensor 10, the control section 30 discriminates whether the card 2 is a short card or a special shaped card which is capable of being processed in the card reader 1 as described below.

In this embodiment, the special shaped card which is capable of being processed is, different from a card having a normal shape in compliance with ISO (JIS) standards, a card having a nonstandard special shape but is capable of being taken into the card reader 1 to perform predetermined processing, for example, reproducing processing and/or recording processing of information. On the other hand, a short card cannot be processed in the card reader 1.

In order to discriminate whether the card 2 is a short card or a special shaped card, first, the control section 30 sets the solenoid 24 in an "OFF" state so that the shutter member 15 is moved in a direction for closing the card feeding passage 6 (step S9). After that, the control section 30 judges whether the card feeding passage 6 has been actually closed by the shutter member 15 or not (step S10). Specifically, based on an output signal from the open-and-close sensor 17, the CPU 32 judges whether the card feeding passage 6 has been actually closed by the shutter member 15.

Figure 10A:
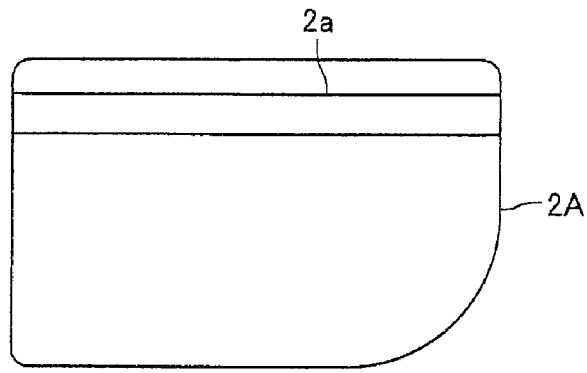
FIGS. 10(A) through 10(D) are explanatory views showing cards having special shapes.
Figure 10B:
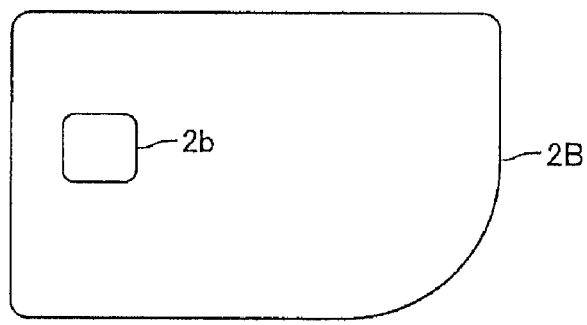
Figure 10C:
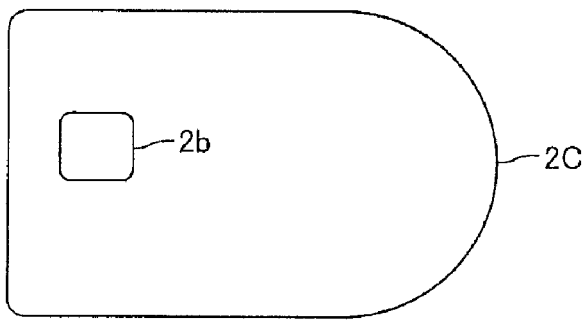
Figure 10D:
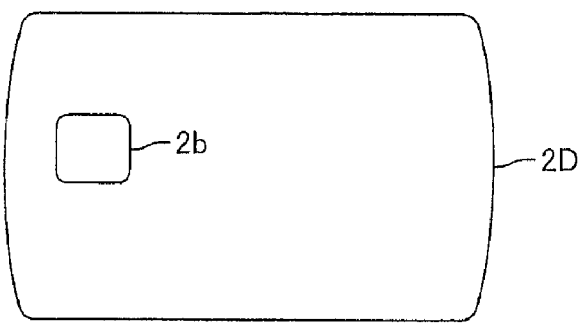

In a case that the card 2 is a special shaped card shown in FIG. 10(C), when the solenoid 24 is turned in an "OFF" state, as shown in FIG. 8(C), the shutter member 15 is abutted with the surface on the rear end side of the card 2 and the shutter member 15 does not close the card feeding passage 6. In other words, when the card 2 is a special shaped card shown in FIG. 10 (C), although the solenoid 24 is in an "OFF" state, the shutter member 15 does not close the card feeding passage 6. In other words, when the shutter member 15 does not close the card feeding passage 6 although the solenoid 24 is in an "OFF" state, the card 2 is a special shaped card, for example, as shown in FIG. 10(C), which is capable of being processed in the card reader 1.

Therefore, in the step S10, when judged that the shutter member 15 has not closed the card feeding passage 6, the control section 30 judges that the card 2 is a special shaped card which is capable of being processed in the card reader 1 and the taking-in control of the card 2 to the inside of the card reader 1 is finished. After that, the control section 30 performs predetermined processing of the card 2 within the card reader 1.

On the other hand, in a case that the card 2 is a short card as shown in FIG. 8(B), when the solenoid 24 is turned in an "OFF" state, the shutter member 15 has closed the card feeding passage 6. Alternatively, as shown in FIG. 9(A), also in a case that the card 2 is a special shaped card capable of being processed but is shorter than the special shaped card shown in FIG. 8(C), when the solenoid 24 is turned in an "OFF" state, the shutter member 15 has closed the card feeding passage 6. In this embodiment, in order to discriminate a shorter special shaped card shown in FIG. 9(A) and a short card, when judged that the shutter member 15 has closed the card feeding passage 6 in the step S10, the control section 30 further performs the following control.

Figure 9B:
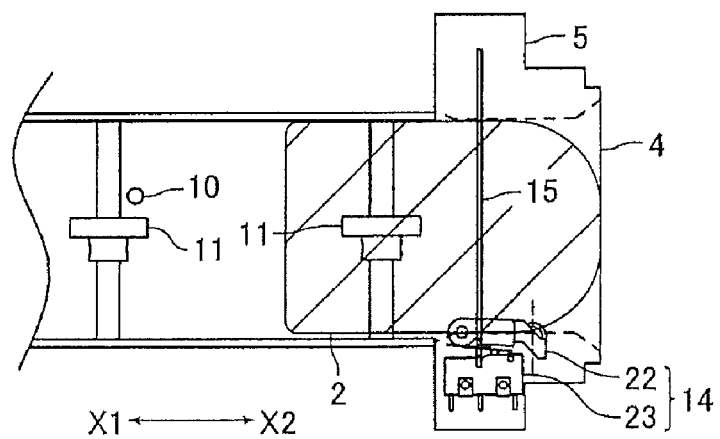

In other words, in the step S10, when judged that the shutter member 15 has closed the card feeding passage 6, the control section 30 sets the solenoid 24 in an "ON" state to retreat the shutter member 15 from the card feeding passage 6 and the card feeding passage 6 is opened (step S11). After that, the control section 30 controls the card feeding mechanism 9 so that the card 2 is carried in the "X2" direction (eject direction) by a distance longer than the feeding distance "L1" and stopped as shown in FIG. 9(B) (step S12). In other words, as shown in FIG. 9(B), the card 2 is carried until the end part in the widthwise direction of the card 2 is abutted with the sensor lever 22 and the card 2 is detected by the card width sensor 23 and then the card 2 is stopped. In accordance with an embodiment of the present invention, in the step S12, the card 2 may be carried by the distance "L1" in the "X2" direction and stopped.

Figure 9C:
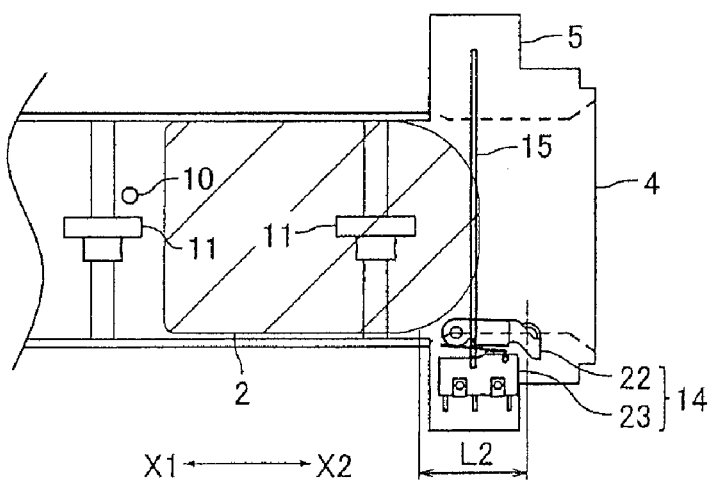

After that, the control section 30 controls the card feeding mechanism 9 to feed the card 2 in the taking-in direction by the feeding distance "L2" shorter than the feeding distance "L1" as shown in FIG. 9(C) and the card 2 is stopped (step S13). After that, the control section 30 sets the solenoid 24 in an "OFF" state so that the shutter member 15 is moved in the direction for closing the card feeding passage 6 (step S14) and then the control section 30 judges whether the shutter member 15 has actually closed the card feeding passage 6 or not (step S15).

When the card 2 is a shorter special shaped card which is shorter than the special shaped card shown in FIG. 8(C), although the solenoid 24 is in an "OFF" state, the shutter member 15 does not close the card feeding passage 6 as shown in FIG. 9(C). In other words, as described above, when the shutter member 15 has not closed the card feeding passage 6 although the solenoid 24 is in an "OFF" state, the card 2 is a shorter special shaped card which is capable of being processed in the card reader 1.

Therefore, in the step S15, when judged that the shutter member 15 has not closed the card feeding passage 6, the control section 30 judges that the card 2 is a shorter special shaped card capable of being processed in the card reader 1 and taking-in control of the card 2 to the inside of the card reader 1 is finished. After that, the control section 30 performs predetermined processing of the card 2 in the inside of the card reader 1.

On the other hand, in the step S15, when judged that the shutter member 15 has closed the card feeding passage 6, the control section 30 judges that the card 2 is a short card which is unable to be processed in the card reader 1 and thus the card 2 is ejected from the card insertion port 4 by the card feeding mechanism 9 (step S16).

In this embodiment, the step S3 is a shutter opening step in which the shutter member 15 is retreated from the card feeding passage 6 when a card 2 inserted from the card insertion port 4 is detected by the card insertion detection mechanism 14. The step S7 is a feeding and stop step in which, after the card 2 inserted from the card insertion port 4 is no longer detected by the card insertion detection mechanism 14, the card 2 is carried in the taking-in direction of the card 2 by a first feeding distance "L1" and then stopped. Further, the step S9 is a shutter closing step in which the shutter member 15 is moved in a direction for closing the card feeding passage 6, and the step S10 is a discrimination step in which the card 2 is discriminated whether it is a special shaped card or not on the basis of a detection result by the open-and-close sensor 17.

In addition, the step S11 is a shutter re-opening step in which the shutter member 15 is retreated from the card feeding passage 6 when the open-and-close sensor 17 detects that the shutter member 15 has closed the card feeding passage 6 in the discrimination step. The step S12 is a reverse feeding and stop step in which the card 2 is carried in the eject direction of the card 2 more than the first feeding distance "L1" and stopped. Further, the step S13 is a re-feeding and stop step in which the card 2 is carried in the taking-in direction of the card 2 by a second feeding distance "L2" shorter than the first feeding distance "L1" and stopped, and the step S14 is a shutter re-closing step in which the shutter member 15 is moved in the direction for closing the card feeding passage 6. In addition, the step S15 is a re-discrimination step in which the card 2 is discriminated whether the card 2 is formed in a shorter special shape or not based on a detection result by the open-and-close sensor 17.

In this embodiment, when the card 2 is judged to be a special shaped card, the control section 30 restricts processing functions of the card reader 1 for the card 2. For example, when the card 2 is a normal shaped card, reproducing and recording processing of information are performed on the card 2 in the card reader 1. However, when the card 2 is a special shaped card, only reproducing processing of information is performed on the card 2 in the card reader 1 and recording processing is not performed.

Further, in this embodiment, in response to a control command from the host control section 31, the control section 30 selects or determines whether the controls from the step S9 to the step S15 are performed or not. In other words, when a discrimination command of a special shaped card is transmitted from the host control section 31, the controls from the step S9 to the step S15 are performed but, when a further discrimination command of a special shaped card is not transmitted from the host control section 31, the controls from the step S9 to the step S15 are not performed.

In addition, in this embodiment, a control program for performing the controls from the step S9 to the step S15 is downloaded from the host control section 31 to the control section 30. Therefore, depending on the host control section 31 to be connected, for example, the feeding distances "L1" and "L2" may be modified arbitrarily.

As described above, in this embodiment, after a card 2 inserted from the card insertion port 4 is no longer detected by the card width sensor 23, the card 2 is carried by the feeding distance "L1" in the "X1" direction and stopped and then, after the shutter member 15 is moved in a direction closing the card feeding passage 6, the control section 30 discriminates whether the card 2 is a special shaped card or not on the basis of the detection result of the open-and-close sensor 17. In other words, in this embodiment, the control section 30 discriminates whether the card 2 is a special shaped card or not on the basis of the detection result of the card insertion detection mechanism 14 and the detection result of the open-and-close sensor 17.

Therefore, in this embodiment, even when a magnetic stripe 2a is not formed on the card 2, an inserted card 2 can be discriminated whether it is a special shaped card or not as described above. Further, in this embodiment, even when a length of the magnetic stripe 2a is a nonstandard length, an inserted card 2 can be discriminated whether it is a special shaped card or not. In other words, in this embodiment, various cards 2 formed in special shapes can be discriminated.

In this embodiment, in the step S10, when judged that the shutter member 15 has closed the card feeding passage 6, the control section 30 carries the card 2 again by the feeding distance "L2" shorter than the feeding distance "L1" and stopped. After that, the shutter member 15 is moved in a direction for closing the card feeding passage 6 and, based on the detection result of the open-and-close sensor 17, the control section 30 discriminates again whether the card 2 is a special shaped card or not. In other words, in this embodiment, the control section 30 discriminates whether the card 2 is a special shaped card or not by using two feeding distances "L1" and "L2" in a step-by-step manner. Therefore, in this embodiment, various cards 2 having special shapes can be discriminated. In other words, the control section 30 is capable of adequately discriminating whether recording processing of information and/or reproducing processing of information for the inserted card 2 are performed in the card reader 1 or not.

In this embodiment, the card insertion detection mechanism 14 is a contact type detection mechanism having a sensor lever 22 which is capable of abutting with a card 2. Therefore, for example, even when an inserted card 2 is transparent, it is possible to discriminate whether the card 2 is a special shaped card or not. In other words, when the card insertion detection mechanism 14 includes a reflection type optical sensor or a transmission type optical sensor, it is difficult to discriminate whether a transparent card 2 capable of passing a light is a special shaped card or not. However, in this embodiment, even when an inserted card 2 is transparent, it is possible to discriminate whether the card 2 is a special shaped card or not. Further, for example, even when a surface color of an inserted card 2 is a color which absorbs light or, even when the surface of the card 2 is a non-mirror face, it is possible to discriminate whether the card 2 is a special shaped card or not. In other words, when the card insertion detection mechanism 14 is a reflection type optical sensor, it is difficult to discriminate whether a card 2 whose surface does not reflect light is a special shaped card or not. However, in this embodiment, even when light is not reflected by the surface of an inserted card 2, it is possible to discriminate whether the card 2 is a special shaped card or not.

In this embodiment, the card 2 is discriminated whether it is a special shaped card or not by utilizing the shutter member 15 and the open-and-close sensor 17. Therefore, another structure except the shutter member 15 and the open-and-close sensor 17 is not required for discriminating whether the card 2 is a special shaped card or not. Accordingly, in this embodiment, a structure of the card reader 1 can be simplified.

In this embodiment, the pre-head 18 and the metal sensor 19 are disposed in the vicinity of the card insertion port 4. Therefore, in this embodiment, it is discriminated whether the inserted card 2 is a magnetic card or not and/or whether it is a contact type IC card or not. Accordingly, the control section 30 is capable of adequately judging what kind of processing is to be performed on the card 2 after it has been taken into the card reader 1.

In this embodiment, when a card 2 is judged to be a special shaped card, the control section 30 restricts processing functions for the card 2 in the card reader 1. Therefore, even when the card 2 taken into the card reader 1 is a special shaped card, an appropriate processing corresponding to the card 2 can be performed.

In this embodiment, the feeding distance "L1" is set depending on a shape of a card 2 which is capable of being processed in the card reader 1. In other words, in this embodiment, the feeding distance "L1" is set so as to correspond to a special shaped card which is circulated in the market where the card reader 1 is installed. Therefore, in this embodiment, it is adequately discriminated whether the card 2 inserted into the card reader 1 is a special shaped card or not.

In this embodiment, the control section 30 selects, depending on a control command from the host control section 31, whether the controls from the step S9 to the step S15 are performed or not. Further, in this embodiment, a control program relating to the controls from the step S9 to the step S15 is downloaded from the host control section 31 to the control section 30. Therefore, in this embodiment, the card reader 1 can be appropriately controlled corresponding to the market where the card reader 1 is installed.

Although the present invention has been shown and described with reference to a specific embodiment, various changes and modifications will be apparent to those skilled in the art from the teachings herein.

In the embodiment described above, in the step S10, when judged that the shutter member 15 has closed the card feeding passage 6, the control section 30 carries the card 2 again by the feeding distance "L2" and stopped and then, after the shutter member 15 is moved in the direction for closing the card feeding passage 6, the control section 30 discriminates again whether the card 2 is a special shaped card or not based on the detection result of the open-and-close sensor 17. However, the present invention is not limited to this embodiment. For example, in the step S10, when judged that the shutter member 15 has closed the card feeding passage 6, the step S16 may be performed. In other words, the control section 30 may not discriminate again whether the card 2 is a special shaped card shorter than the special shaped card shown in FIG. 10(C) or not.

In the embodiment described above, the control section 30 discriminates in a step-by-step manner whether the card 2 is a special shaped card or not by using two feeding distances "L1" and "L2". However, the control section 30 may discriminate in a step-by-step manner whether the card 2 is a special shaped card or not by using three or more feeding distances. For example, in the step S15, when judged that the shutter member 15 has closed the card feeding passage 6, similarly to the step S11 through the S15, the control section 30 may feed the card 2 again by a feeding distance shorter than the feeding distance "L2" and stopped and then, after the shutter member 15 is moved in the direction for closing the card feeding passage 6, the control section 30 discriminates again whether the card 2 is a further shorter special shaped card or not based on the detection result of the open-and-close sensor 17. Further, this control may be repeated while the feeding distance is gradually shortened.

In the embodiment described above, three feeding rollers 11 are disposed in the card processing part 3 and the shutter member 15 is disposed nearer to the card insertion port 4 side than the feeding roller 11 in the feeding direction of a card 2. However, the present invention is not limited to this embodiment. For example, it may be structured that one of feeding rollers 11 is disposed in the card insertion part 5 and the shutter member 15 is disposed between a feeding roller 11 disposed in the card processing part 3 and the feeding roller 11 disposed in the card insertion part 5 in the feeding direction of a card 2.

In this case, a card 2 may be discriminated whether it is a special shaped card or not by means of that, immediately after the tip end of the card 2 inserted from the card insertion port 4 has passed the position of the shutter member 15, the solenoid 24 is turned in an "OFF" state to move the shutter member 15 toward the direction for closing the card feeding passage 6, and a length of the card 2 is measured on the basis of an output signal from the open-and-close sensor 17 and an output signal from the encoder 33. In other words, a card 2 may be discriminated whether it is a special shaped card or not by means of that a length of the card 2 is measured by using an output signal of the encoder 33 while an output signal has been outputted from the open-and-close sensor 17.

Further, in addition to the shutter member 15, when the sensor lever 22 is disposed between the feeding roller 11 disposed in the card processing part 3 and the feeding roller 11 disposed in the card insertion part 5, immediately after the card 2 is detected by the card width sensor 23 (in other words, immediately after the tip end of the card 2 is detected), the card 2 is carried by a predetermined feeding distance in the taking-in direction and stopped and then, the shutter member 15 is moved in the direction for closing the card feeding passage 6, and a card 2 may be discriminated whether it is a special shaped card or not on the basis of the detection result of the open-and-close sensor 17. In other words, in this case, after a card 2 is detected by the card width sensor 23, the card 2 may be carried by a predetermined feeding distance in the taking-in direction and stopped on the basis of an output signal of the encoder fixed to the feeding roller 11 which is disposed at the card insertion part 5. Therefore, also in this case, a card 2 is discriminated whether it is a special shaped card or not.

In the embodiment described above, a card 2 may be discriminated whether it is a special shaped card or not by utilizing the shutter member 15 and the open-and-close sensor 17. However, the present invention is not limited to this embodiment. For example, the card reader 1 may be provided with another structure for discriminating whether a card 2 is a special shaped card or not in addition to the shutter member 15 and the open-and-close sensor 17. In other words, the card reader 1 may be provided, in addition to the shutter member 15 and the open-and-close sensor 17, with a card surface abutting member which is capable of protruding to and retreated from the card feeding passage 6 so as to be capable of abutting with the surface of a card 2, and an abutting member sensor for detecting a protruding and retreating state to and from the card feeding passage 6 of the card surface abutting member. In this case, instead of using the shutter member 15 and the open-and-close sensor 17, a card 2 may be discriminated whether it is a special shaped card or not by utilizing the card surface abutting member and the abutting member sensor.

In the embodiment described above, the protruded part 15a is formed in the shutter member 15. It is preferable that the protruded part 15a is formed so as to correspond to the position of the feeding roller 11 in a widthwise direction of a card 2. When a card 2 shorter than a distance between the feeding rollers 11 (short card) has been taken into the card reader 1, the card 2 cannot be ejected from the card reader 1. In other words, a card 2 may be judged with the distance between the feeding rollers 11 as a reference whether a card 2 is capable of being handled in the card reader 1 or not. Therefore, when the protruded part 15a is formed so as to correspond to the arranging position of the feeding roller 11, a card 2 can be discriminated more accurately whether the card 2 having a nonstandard shape can be handled in the card reader 1 or not.

Further, the protruded part 15a may be formed on a reverse side to a side where the card insertion detection mechanism 14 is disposed in a widthwise direction of a card 2. In this case, immediately after a tip end of a card 2 inserted from the card insertion port 4 has passed the position of the shutter member 15, the solenoid 24 is turned to an "OFF" state so that the shutter member 15 is moved to a direction for closing the card feeding passage 6 and, in this manner, based on an output signal from the open-and-close sensor 17 and an output signal from the card width sensor 23, a shape of an end part of a card 2 in the widthwise direction can be obtained. In accordance with an embodiment of the present invention, no protruded part 15a may be formed in the shutter member 15.

In the embodiment described above, the card insertion detection mechanism 14 is a contact type detection mechanism but the card insertion detection mechanism 14 may be an optical type detection mechanism. Further, in the embodiment described above, the shutter drive mechanism 16 is structured of the solenoid 24 and the link mechanism 25 but the shutter drive mechanism 16 may be structured of a motor, gears and the like.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card reader comprising:
a card insertion port into which a card is inserted;
a card feeding passage along which the card inserted from the card insertion port is carried;
a card surface abutting member which is capable of protruding to and retreating from the card feeding passage and which is capable of abutting with a surface of the card;
an abutting member sensor for detecting a protruding and retreating state of the card surface abutting member to and from the card feeding passage;
a card insertion detection mechanism for detecting whether the card is inserted from the card insertion port or not; and
a control section for discriminating whether the card is a special shaped card or not on a basis of a detection result of the abutting member sensor and a detection result of the card insertion detection mechanism;
  wherein the card insertion detection mechanism is a contact type detection mechanism including a card end contact member which is capable of protruding to and retreating from the card feeding passage and which is capable of abutting with an end part of the card in a widthwise direction of the card substantially perpendicular to a thickness direction of the card and a taking-in direction of the card;
  wherein the card surface abutting member is a shutter member for opening or closing the card feeding passage and the abutting member sensor is an open-and-close sensor for detecting an open-and-close state of the shutter member.

2. The card reader according to claim 1, further comprising
  a card feeding mechanism for carrying the card along the card feeding passage, and
  a shutter drive mechanism for driving the shutter member,
  wherein the control section controls the card feeding mechanism, after a card detected state by the card insertion detection mechanism has changed to a non-detected state, so that the card is carried by a first feeding distance in the taking-in direction of the card and is stopped, and the control section controls the shutter drive mechanism so that the shutter member is moved in a direction for closing the card feeding passage, and the control section discriminates whether the card is the special shaped card or not on a basis of a detection result of the open-and-close sensor.

3. The card reader according to claim 2, wherein the first feeding distance is set depending on a shape of the card on which at least one of recording processing and reproducing processing of information is performed in the card reader.

4. The card reader according to claim 2, further comprising at least one of:
  a pre-head which is disposed in a vicinity of the card insertion port for reproducing information recorded in a magnetic stripe formed on a surface of the card, and
  a metal sensor which is disposed in a vicinity of the card insertion port for detecting an IC chip in the card.

5. The card reader according to claim 2, wherein the control section restricts a processing function for the card in the card reader when judged that the card is the special shaped card.

6. The card reader according to claim 2, wherein
  the control section is connected to a host control section for controlling a host device on which the card reader is mounted, and
  the control section selects whether discrimination for the special shaped card is performed or not depending on a control command from the host control section.

7. The card reader according to claim 2, wherein
  the control section is connected to a host control section for controlling a host device on which the card reader is mounted, and
  a control program which relates to a control for discriminating whether the card is the special shaped card or not is capable of being downloaded from the host control section.

8. The card reader according to claim 2, wherein the special shaped card is a card whose at least one corner on a rear end side in the taking-in direction is formed in a curved shape having a larger radius of curvature in comparison with a normal shaped card.

9. The card reader according to claim 8, wherein
  the card feeding mechanism includes at least two feeding rollers, and a detection sensor for detecting a card is disposed nearer to a card insertion port side in the taking-in direction than a feeding roller which is disposed on an inner side of the two feeding rollers, and
  the control section detects presence and absence of the card by the detection sensor when the card has been carried by the first feeding distance and stopped and, when the card is detected, the control section judges that the card is a normal shaped card and, when the card is not detected, the control section moves the shutter member in a direction for closing the card feeding passage, and the control section discriminates whether the card is the special shaped card or not on the basis of the detection result by the open-and-close sensor.

10. The card reader according to claim 9, wherein
  in a case that the card has been carried by the first feeding distance and stopped and, in this state, when the card is not detected by the detection sensor and, in addition, when the card is not detected by the open-and-close sensor,
  the control section carries the card by not less than the first feeding distance in an eject direction of the card and then the control section carries the card by a second feeding distance shorter than the first feeding distance in the taking-in direction and stopped and, in this state, the shutter member is moved in the direction for closing the card feeding passage, and the control section discriminates whether the card is the special shaped card or not on the basis of the detection result of the open-and-close sensor.

11. A card reader comprising:
  a card insertion port into which a card is inserted;
  a card feeding passage along which the card inserted from the card insertion port is carried;
  a card surface abutting member which is capable of protruding to and retreating from the card feeding passage and which is capable of abutting with a surface of the card;
  an abutting member sensor for detecting a protruding and retreating state of the card surface abutting member to and from the card feeding passage;
  a card insertion detection mechanism for detecting whether the card is inserted from the card insertion port or not; and
a control section for discriminating whether the card is a special shaped card or not on a basis of a detection result of the abutting member sensor and a detection result of the card insertion detection mechanism;
  wherein the card surface abutting member is a shutter member for opening or closing the card feeding passage and the abutting member sensor is an open-and-close sensor for detecting an open-and-close state of the shutter member.

12. The card reader according to claim 11, further comprising
  a card feeding mechanism for carrying the card along the card feeding passage, and
  a shutter drive mechanism for driving the shutter member,
  wherein the control section controls the card feeding mechanism, after a card detected state by the card insertion detection mechanism has changed to a non-detected state, so that the card is carried by a first feeding distance in the taking-in direction of the card and is stopped, and the control section controls the shutter drive mechanism so that the shutter member is moved in a direction for closing the card feeding passage, and the control section discriminates whether the card is the special shaped card or not on a basis of a detection result of the open-and-close sensor.

13. The card reader according to claim 12, wherein the first feeding distance is set depending on a shape of the card on which at least one of recording processing and reproducing processing of information is performed in the card reader.

14. The card reader according to claim 12, further comprising at least one of;
a pre-head which is disposed in a vicinity of the card insertion port for reproducing information recorded in a magnetic stripe formed on a surface of the card, and
a metal sensor which is disposed in a vicinity of the card insertion port for detecting an IC chip in the card.

15. The card reader according to claim 12, wherein the control section restricts a processing function for the card in the card reader when judged that the card is the special shaped card.

16. The card reader according to claim 12, wherein
the control section is connected to a host control section for controlling a host device on which the card reader is mounted, and
the control section selects whether discrimination for the special shaped card is performed or not depending on a control command from the host control section.

17. The card reader according to claim 12, wherein
the control section is connected to a host control section for controlling a host device on which the card reader is mounted, and
a control program which relates to a control for discriminating whether the card is a special shaped card or not is capable of being downloaded from the host control section.

18. The card reader according to claim 12, wherein
the card feeding mechanism includes at least two feeding rollers and a detection sensor for detecting presence of a card is disposed nearer to a card insertion port side in the taking-in direction than a feeding roller which is disposed on an inner side of the two feeding rollers, and
the control section detects presence of the card by the detection sensor when the card has been carried by the first feeding distance and stopped and, when the card is detected, the control section judges that the card is a normal shaped card and, when the card is not detected, the control section moves the shutter member in a direction for closing the card feeding passage, and the control section discriminates whether the card is the special shaped card or not on the basis of the detection result by the open-and-close sensor.

19. A control method for a card reader which includes a card feeding passage along which a card inserted from a card insertion port is carried, a shutter member for opening and closing the card feeding passage, an open-and-close sensor for detecting an open-and-close state of the shutter member, and a card insertion detection mechanism for detecting whether the card is inserted from the card insertion port or not, the control method comprising:
a shutter opening step in which the shutter member is retreated from the card feeding passage when the card inserted from the card insertion port is detected by the card insertion detection mechanism;
a feeding and stop step which is performed after the shutter opening step and after a card detected state by the card insertion detection mechanism has changed to a non-detected state, and in which the card is carried by a first feeding distance in a taking-in direction of the card and stopped;
a shutter closing step which is performed after the feeding and stop step and in which the shutter member is moved in a direction for closing the card feeding passage; and
a discrimination step in which the card is discriminated whether the card is a special shaped card or not on a basis of a detection result by the open-and-close sensor after the shutter closing step.

20. The control method for a card reader according to claim 19, wherein the special shaped card is a card whose at least one corner on a rear end side in the taking-in direction is formed in a curved shape having a larger radius of curvature in comparison with a normal shaped card.

21. The control method for a card reader according to claim 20, wherein
the card reader includes a card feeding mechanism provided with at least two feeding rollers, and a detection sensor for detecting presence of a card which is disposed nearer to a card insertion port side in the taking-in direction than a feeding roller disposed on an inner side of the two feeding rollers, and
when the card is detected by the detection sensor in the feeding and stop step, the card is judged as the normal shaped card and, when the card is not detected, the shutter closing step and the discrimination step are performed to discriminate whether the card is the special shaped card or not.

22. The control method for a card reader according to claim 21, further comprising
a shutter re-opening step in which the shutter member is retreated from the card feeding passage when the open-and-close sensor detects that the shutter member has closed the card feeding passage in the discrimination step,
a reverse feeding and stop step which is performed after the shutter re-opening step so that the card is carried in an eject direction of the card by not less than the first feeding distance and stopped,
a re-feeding and stop step which is performed after the reverse feeding and stop step so that the card is carried in the taking-in direction of the card by a second feeding distance shorter than the first feeding distance and stopped,
a shutter re-closing step which is performed after the re-feeding and stop step so that the shutter member is moved in a direction for closing the card feeding passage, and
a re-discrimination step in which the card is discriminated whether the card is the special shaped card or not on the basis of the detection result by the open-and-close sensor after the shutter re-closing step.

23. The control method for a card reader according to claim 19, further comprising
a shutter re-opening step in which the shutter member is retreated from the card feeding passage when the open-and-close sensor detects that the shutter member has closed the card feeding passage in the discrimination step,
a reverse feeding and stop step which is performed after the shutter re-opening step so that the card is carried in an eject direction of the card by not less than the first feeding distance and stopped,
a re-feeding and stop step which is performed after the reverse feeding and stop step so that the card is carried in the taking-in direction of the card by a second feeding distance shorter than the first feeding distance and stopped, a shutter re-closing step which is performed after the re-feeding and stop step so that the shutter member is moved in a direction for closing the card feeding passage, and a re-discrimination step in which the card is discriminated whether the card is the special shaped card or not on the basis of the detection result by the open-and-close sensor after the shutter re-closing step.

* * * * *